(12) United States Patent
Park

(10) Patent No.: US 12,512,777 B2
(45) Date of Patent: Dec. 30, 2025

(54) STEERING CONTROL DEVICE AND METHOD OF VEHICLE

(71) Applicant: HL MANDO CORPORATION, Gyeonggi-do (KR)

(72) Inventor: Jaesang Park, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 149 days.

(21) Appl. No.: 18/388,143

(22) Filed: Nov. 8, 2023

(65) Prior Publication Data

US 2024/0421740 A1 Dec. 19, 2024

(30) Foreign Application Priority Data

Jun. 15, 2023 (KR) .................. 10-2023-0076645

(51) Int. Cl.
*H02P 25/22* (2006.01)
*B62D 5/04* (2006.01)

(52) U.S. Cl.
CPC .............. *H02P 25/22* (2013.01); *B62D 5/046* (2013.01)

(58) Field of Classification Search
CPC .................................. H02P 25/22; B62D 5/046
See application file for complete search history.

(56) References Cited

U.S. PATENT DOCUMENTS

2020/0055542 A1* 2/2020 Yamamoto ........... B62D 5/0481
2020/0331517 A1* 10/2020 Toko ..................... H02P 29/028

FOREIGN PATENT DOCUMENTS

| JP | 2021-197866 | 12/2021 |
| KR | 10-2020-0091651 | 7/2020 |
| KR | 10-2021-0152695 | 12/2021 |

* cited by examiner

*Primary Examiner* — Zoheb S Imtiaz
(74) *Attorney, Agent, or Firm* — WOMBLE BOND DICKINSON (US) LLP

(57) ABSTRACT

The present embodiments relate to a steering control device and method of a vehicle. A steering control device according to embodiments may include a dual winding steering motor unit including a first winding motor and a second winding motor therein, and a controller configured to, in order to switch a driving power supplied from a power supply unit to drive the dual winding steering motor unit, detect an output value based on a phase current detection value detected by a phase current sensor, and compare the output value with a reference value and control the dual winding steering motor unit to a target output value based on the comparison result.

11 Claims, 9 Drawing Sheets

ND METHOD OF VEHICLE

STEERING CONTROL DEVICE AND METHOD OF VEHICLE

CROSS REFERENCE TO RELATED APPLICATION

This application claims priority from Korean Patent Application No. 10-2023-0076645, filed on Jun. 15, 2023, which is hereby incorporated by reference for all purposes as if fully set forth herein.

TECHNICAL FIELD

An embodiment of the present disclosure relates to a steering control device and method of a vehicle capable of controlling vehicle steering using an electric motor.

BACKGROUND

An electronic steering device may refer to a device capable of changing a steering angle of a wheel based on a steering force (or rotational force) applied to a steering wheel by a driver.

That is, the steering control device may be a device which assists a steering force so as for a driver to lightly perform steering by using a steering motor.

Recently, there is being actively conducted a research on a redundancy system as a technology related to autonomous driving.

A steering control device having a redundancy function may generally include a plurality of sensors, a plurality of electronic control units (ECUs), and a plurality of steering motors.

In a steering control device implementing a redundancy system, there may occur a case in which the voltages supplied to a plurality of ECUs vary dure to a failure or a performance degradation of a converter.

In this case, if the voltage supplied to either ECU is reduced, there may occur a problem in which the total output of a steering motor is reduced.

SUMMARY

According to the present embodiments, if an output limit occurs due to a decrease in the voltage supplied to any one ECU among the plurality of ECUs, a steering control device may maximize an output of the ECU whose output is low and increase an output of the ECU where the output limit does not occur so as to maintain the entire output at a normal output, thereby stably performing the steering of a vehicle.

In accordance with an aspect of the present disclosure, there is provided a steering control device of a vehicle including a dual winding steering motor unit including a first winding motor and a second winding motor therein, and a controller configured to, in order to switch a driving power supplied from a power supply unit to drive the dual winding steering motor unit, detect an output value based on a phase current detection value detected by a phase current sensor, and compare the output value with a reference value and control the dual winding steering motor unit to a target output value based on the comparison result.

The controller may include a first inverter configured to drive the first winding motor by switching the driving power supplied from the power supply unit, a second inverter configured to drive the second winding motor by switching the driving power supplied from the power supply unit, a first controller configured to detect a first output value of the first inverter based on a phase current detection value of the first inverter detected by the phase current sensor; and a second controller configured to detect a second output value of the second inverter based on a phase current detection value of the second inverter detected by the phase current sensor. In this case, the first controller and the second controller may exchange information on the first output value and the second output value through an internal communication, compare the first output value and the second output value with the reference value and determine the target output value according to the comparison result, and the first inverter and the second inverter may control the first winding motor and the second winding motor according to the target output values.

The power supply unit may include a first driving power supply unit for supplying the driving power to the first inverter. In addition, the first controller may include a first output value detector configured to detect the first output value of the first inverter based on the phase current detection value of the first inverter detected by the phase current sensor, a first output value determiner configured to request the second output value through the internal communication, compare the second output value with the reference value, and determine the target output value to output the first output value high if the second output value is lower than the reference value, and a first control signal output unit configured to output a control signal so that the first inverter controls the first winding motor to the target output value according to the target output value.

The power supply unit may include a second driving power supply unit for supplying the driving power to the second inverter. In addition, the second controller may include a second output value detector configured to detect the second output value of the second inverter based on the phase current detection value of the second inverter detected by the phase current sensor, a second output value determiner configured to request the first output value through the internal communication, compare the first output value with the reference value, and determine the target output value to output the second output value high if the first output value is lower than the reference value, and a second control signal output unit configured to output a control signal so that the second inverter controls the second winding motor to the target output value according to the target output value.

The controller may be configured to detect a maximum output value of the first inverter if the first output value is lower than the reference value, determine the target output value of the second output value in a state in which the first output value is output at a maximum such that a value obtained by adding the first output value and the second output value is a preset control value, and output a control signal so that the second inverter controls the second winding motor to the target output value according to the determined target output value.

The controller may be configured to detect a maximum output value of the second inverter if the second output value is lower than the reference value, determine the target output value of the first output value in a state in which the second output value is output at a maximum such that a value obtained by adding the first output value and the second output value is a preset control value, and output a control signal so that the first inverter controls the first winding motor to the target output value according to the determined target output value.

The controller may be configured to detect a maximum output value of the first inverter and a maximum output value of the second inverter, equally determine, if the maximum output value of the first inverter is higher than the reference value and the maximum output value of the second inverter is higher than the reference value, the target output values of the first output value and the second output value such that a sum of the first output value and the second output value is a preset control value, and output, according the determined target output values, a control signal so that the first inverter controls the first winding motor to the target output value, and output a control signal so that the second inverter controls the second winding motor to the target output value.

The controller may be configured to detect a maximum output value of the first inverter and a maximum output value of the second inverter, determine a maximum output value of the first output value and the second output value as the target output value if the maximum output value of the first inverter is lower than the reference value and the maximum output value of the second inverter is lower than the reference value, and output, according the determined target output values, a control signal so that the first inverter controls the first winding motor to the target output value, and output a control signal so that the second inverter controls the second winding motor to the target output value.

The controller may be configured to detect a maximum output value of the f inverter and a maximum output value of the second inverter, determine, if the maximum output value of the first inverter is higher than the reference value and the maximum output value of the second inverter is higher than the reference value, that an operation state of the dual winding steering motor unit is normal and output normal state information.

The controller may be configured to detect a maximum output value of the first inverter and a maximum output value of the second inverter, determine, if the maximum output value of the first inverter is higher than the reference value and the maximum output value of the second inverter is lower than the reference value, that an operation state of the dual winding steering motor unit is normal, and output a second output value warning and normal state information at the same time.

The controller may be configured to detect a maximum output value of the first inverter and a maximum output value of the second inverter, determine, if the maximum output value of the first inverter is lower than the reference value and the maximum output value of the second inverter is higher than the reference value, that an operation state of the dual winding steering motor unit is normal, and output a first output value warning and normal state information at the same time.

The controller may be configured to detect a maximum output value of the first inverter and a maximum output value of the second inverter, determine, if the maximum output value of the first inverter is lower than the reference value and the maximum output value of the second inverter is lower than the reference value, that an operation state of the dual winding steering motor unit is an insufficient output state, and output state information indicating the insufficient output state.

The phase current sensor may include a first shunt sensor connected to a ground terminal of the first inverter, and a second shunt sensor connected to a ground terminal of the second inverter.

In accordance with another aspect of the present disclosure, there is provided a steering control method of a vehicle including a first control step, in which a first controller of a controller detects a first output value of a first inverter based on a phase current detection value of the first inverter detected by a phase current sensor and compares the first output value with a reference value to determine a target output value according to the comparison result, and the first inverter controls a first winding motor to the target output value; a second control step, in which a second controller of the controller detects a second output value of a second inverter based on a phase current detection value of the second inverter detected by the phase current sensor and compares the second output value with a reference value to determine a target output value according to the comparison result, and the second inverter controls a second winding motor to the target output value; and exchanging, by the controller, information on the first output value and the second output value through an internal communication, comparing the first output value and the second output value with the reference value to determine the target output value according to the comparison result.

The first control step may include detecting, by a first output value detector of the first controller, the first output value of the first inverter based on the phase current detection value of the first inverter detected by the phase current sensor; requesting, by a first output value determiner of the first controller, the second output value through the internal communication, comparing the second output value with the reference value, and determining the target output value to output the first output value high if the second output value is lower than the reference value; outputting, by a first control signal output unit, a control signal so that the first inverter controls the first winding motor to the target output value according to the determined target output value, and supplying, by the first inverter, driving power to the first winding motor with the target output value according to the control signal.

The second control step may include detecting, by a second output value detector of the second controller, the second output value of the second inverter based on the phase current detection value of the second inverter detected by the phase current sensor; requesting, by a second output value determiner of the second controller, the first output value through the internal communication, comparing the first output value with the reference value, and determining the target output value to output the second output value high if the first output value is lower than the reference value; outputting, by a second control signal output unit, a control signal so that the second inverter controls the second winding motor to the target output value according to the determined target output value; and supplying, by the second inverter, driving power to the second winding motor with the target output value according to the control signal.

The controller may detect a maximum output value of the first inverter if the first output value is lower than the reference value, determine the target output value of the second output value in a state in which the first output value is output at a maximum such that a value obtained by adding the first output value and the second output value is a preset control value, and output a control signal so that the second inverter controls the second winding motor to the target output value according to the determined target output value.

The controller may detect a maximum output value of the second inverter if the second output value is lower than the reference value, determine the target output value of the first output value in a state in which the second output value is output at a maximum such that a value obtained by adding the first output value and the second output value is a preset control value, and output a control signal so that the first inverter controls the first winding motor to the target output value according to the determined target output value.

The controller may detect a maximum output value of the first inverter and a maximum output value of the second inverter, equally determine, if the maximum output value of the first inverter is higher than the reference value and the maximum output value of the second inverter is higher than the reference value, the target output values of the first output value and the second output value such that a sum of the first output value and the second output value is a preset control value, and output, according the determined target output values, a control signal so that the first inverter controls the first winding motor to the target output value, and output a control signal so that the second inverter controls the second winding motor to the target output value.

The controller may detect a maximum output value of the first inverter and a maximum output value of the second inverter, determine a maximum output value of the first output value and the second output value as the target output value if the maximum output value of the first inverter is lower than the reference value and the maximum output value of the second inverter is lower than the reference value, and outputs, according the determined target output values, a control signal so that the first inverter controls the first winding motor to the target output value, and output a control signal so that the second inverter controls the second winding motor to the target output value.

According to the present embodiments, there may provide a steering control device and method, if an output limit occurs due to a decrease in the voltage supplied to any one ECU among the plurality of ECUs, capable of maximizing an output of the ECU whose output is low and increasing an output of the ECU where the output limit does not occur so as to maintain the entire output at a normal output, thereby stably performing the steering of a vehicle.

DETAILED DESCRIPTION

Figure 1:
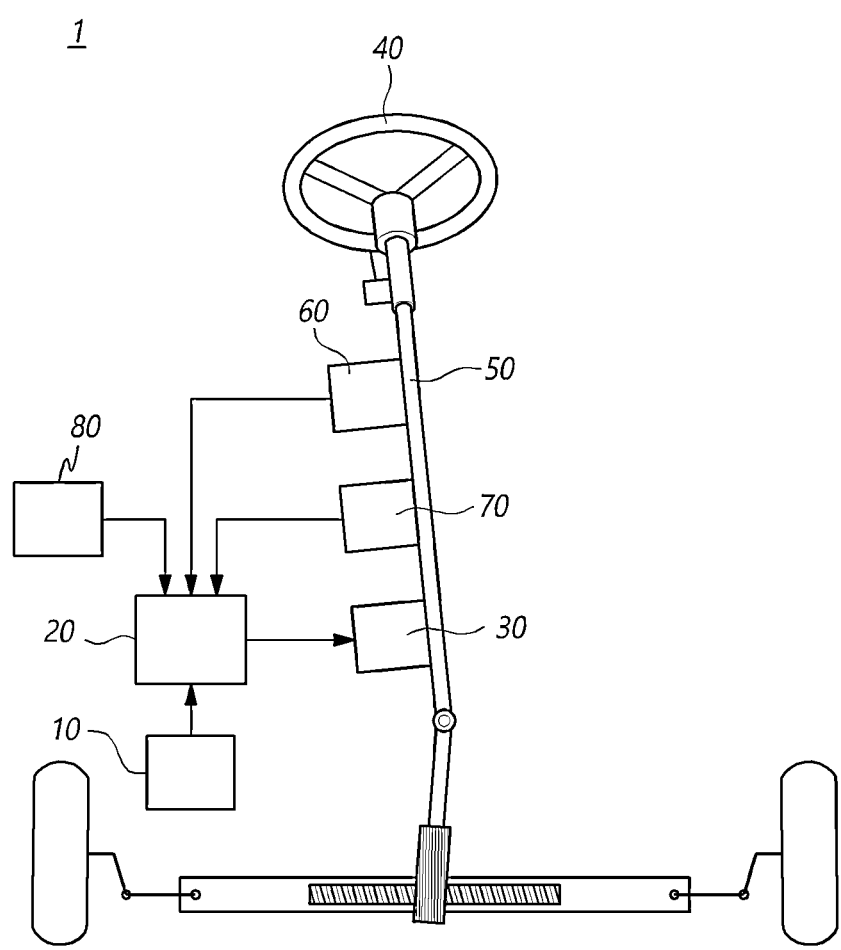
FIG. 1 illustrates a steering control device according to an embodiment.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Figure 2:
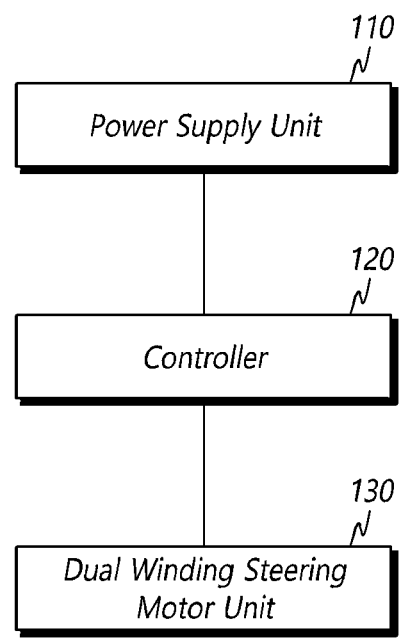
FIG. 2 illustrates a block diagram illustrating a power supply unit, a controller and a dual winding steering motor unit of a steering control device according to an embodiment.
Figure 3:
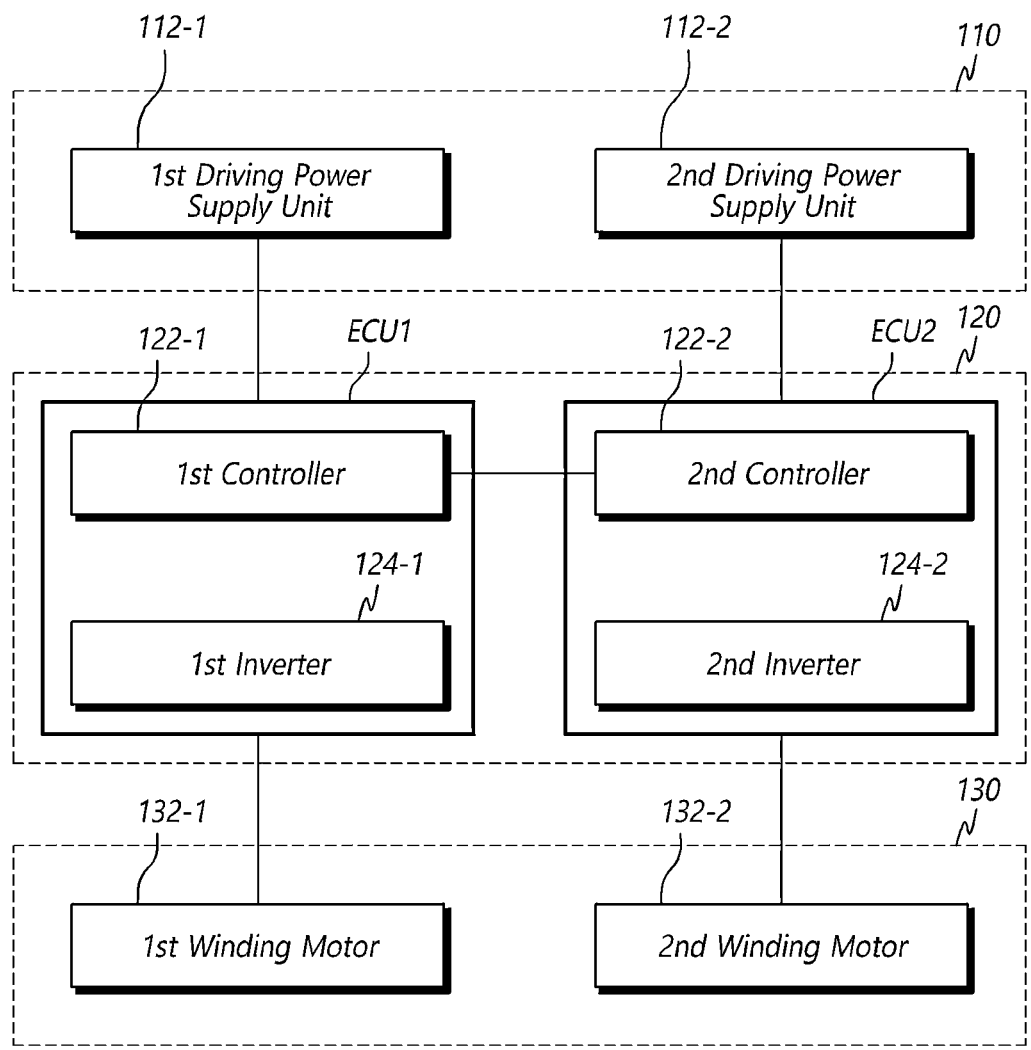
FIG. 3 illustrates a block diagram illustrating detailed configurations of a power supply unit, a controller and a dual winding steering motor unit.
Figure 4:
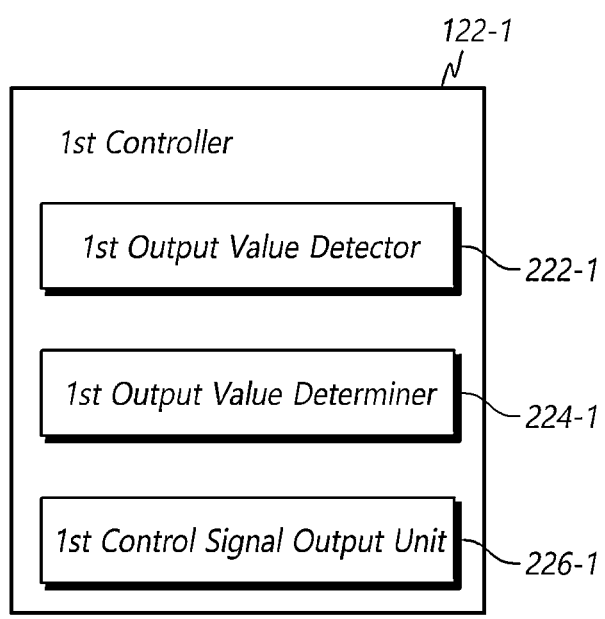
FIG. 4 is a block diagram illustrating a detailed configuration of a first controller according to an embodiment.
Figure 5:
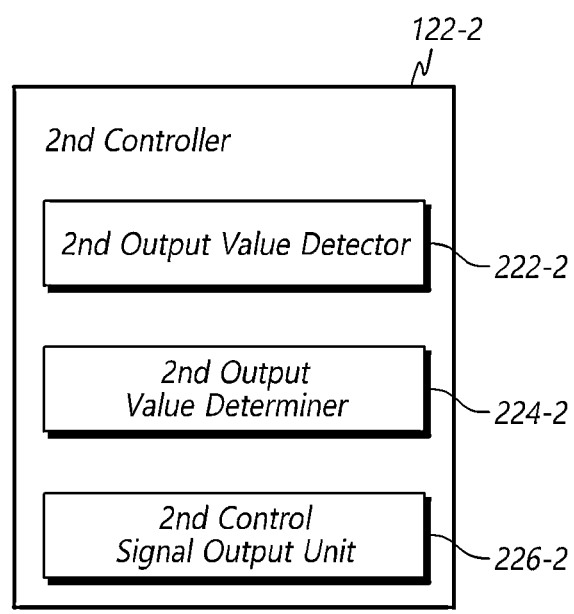
FIG. 5 is a block diagram illustrating a detailed configuration of a second controller according to an embodiment.
Figure 6:
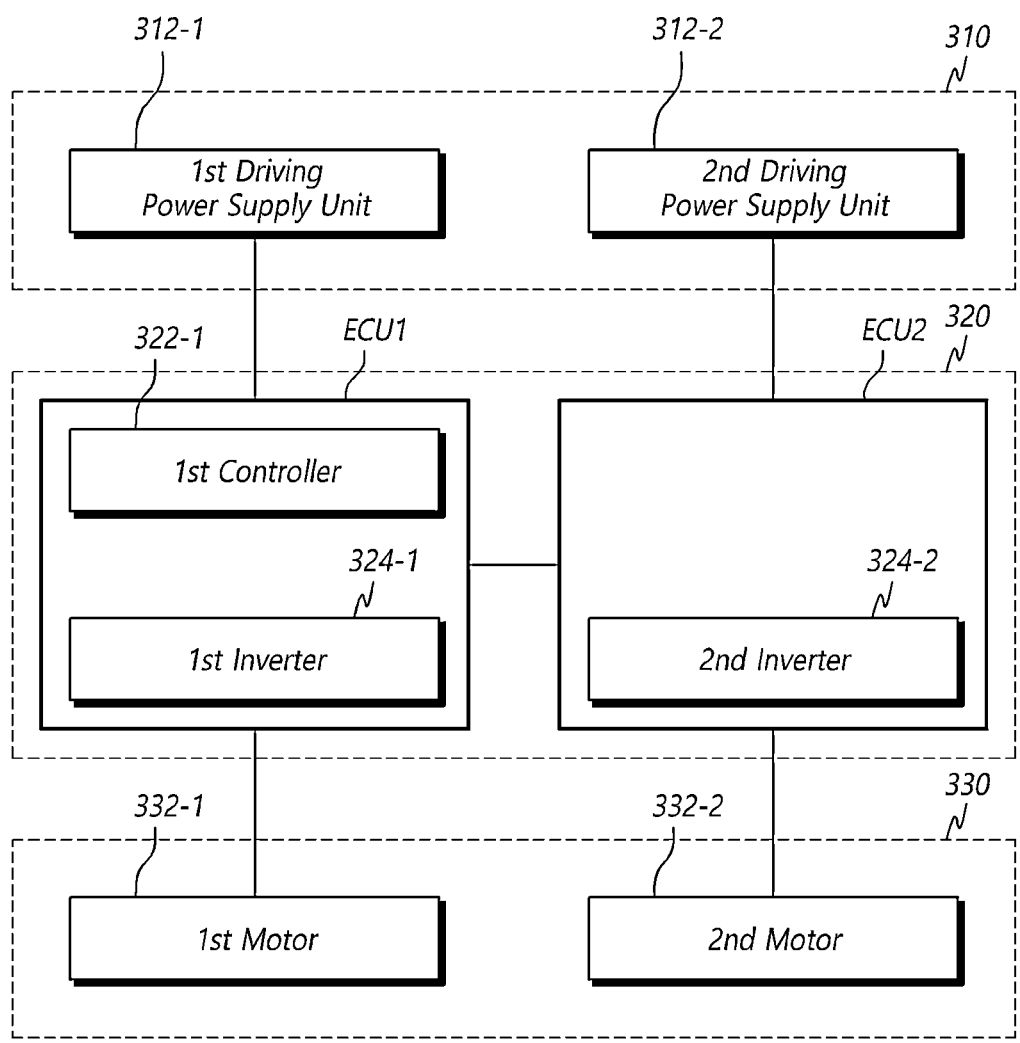
FIG. 6 is a block diagram illustrating detailed configurations of a power supply unit, a controller, and a dual winding steering motor unit according to another embodiment.
Figure 7:
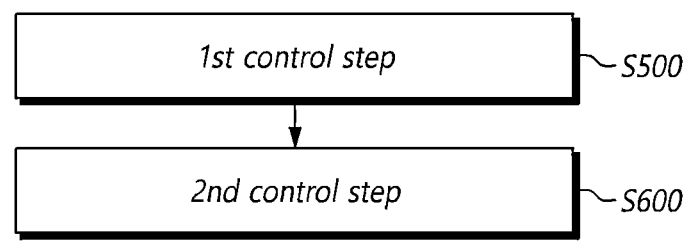
FIG. 7 is a flowchart illustrating a steering control method of a vehicle according to an embodiment.
Figure 8:
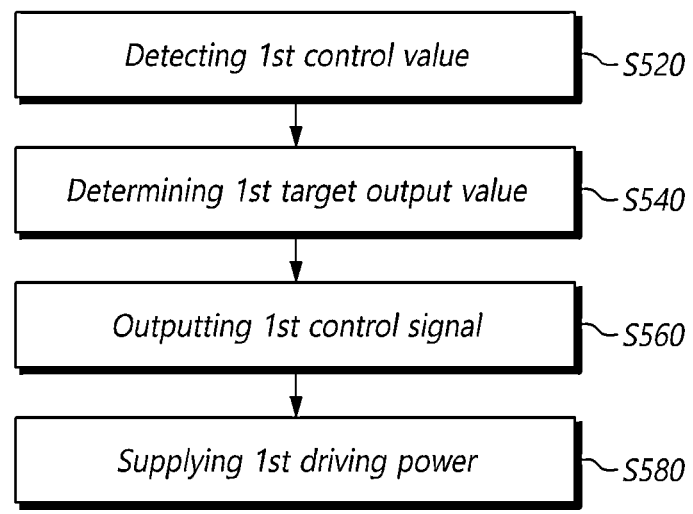
FIG. 8 is a flowchart illustrating a first control step according to an embodiment.
Figure 9:
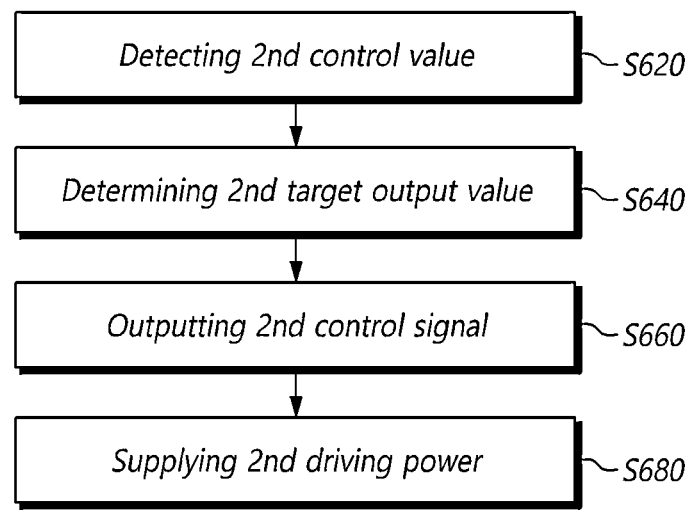
FIG. 9 is a flowchart illustrating a second control step according to an embodiment.

FIG. 1 illustrates a steering control device according to an embodiment, FIG. 2 illustrates a block diagram illustrating a power supply unit, a controller and a dual winding steering motor unit of a steering control device according to an embodiment, FIG. 3 illustrates a block diagram illustrating detailed configurations of a power supply unit, a controller and a dual winding steering motor unit, FIG. 4 is a block diagram illustrating a detailed configuration of a first controller according to an embodiment, FIG. 5 is a block diagram illustrating a detailed configuration of a second controller according to an embodiment, FIG. 6 is a block diagram illustrating detailed configurations of a power supply unit, a controller, and a dual winding steering motor unit according to another embodiment, FIG. 7 is a flowchart illustrating a steering control method of a vehicle according to an embodiment, FIG. 8 is a flowchart illustrating a first control step according to an embodiment, and FIG. 9 is a flowchart illustrating a second control step according to an embodiment.

A steering control device of a vehicle may include an electronic power steering (EPS) which uses an electric motor to assist an operating force of a steering wheel, and a steer-by-wire (SBW) type steering device in which an upper device including a steering wheel and a reaction force motor and a lower device including a rack and a steering motor are mechanically separated.

This embodiment may be applied to an electric motor in a column-type electric power steering (C-EPS) device, a rack-type electric power steering (R-EPS) device, or a steer-by-wire type steering devices.

Hereinafter, the structure of the column-type electric power steering device will be described in this embodiment as an example, but is not limited thereto, and can be applied to all types of steering control devices.

FIG. 1 illustrates a steering control device according to an embodiment.

As shown in FIG. 1, a steering control device according an embodiment may include a power supply unit 10, a controller 20, a dual winding steering motor unit 30, a steering wheel 40, a steering shaft 50, a steering angle sensor 60, a torque sensor 70, a speed sensor 80 and the like.

The steering wheel 40 may be rotated by a driver's manipulation. The steering wheel 40 may be coupled to an input shaft of the steering shaft 50 and may be connected to a rack bar through a pinion gear connected to the output shaft of the steering shaft 50 and a rack gear.

The steering shaft 50 may include the input shaft coupled to the steering wheel 40 and an output shaft rotating together with the input shaft, and may be rotated together with the steering wheel 40.

Although not shown, the steering shaft 50 may be linked with a plurality of reducers, and any one of the plurality of reducers may be coupled to a steering column on which the steering shaft 50 is rotatably supported.

The steering angle sensor 60 may detect a steering angle generated by rotation of the steering wheel 40. In addition, the steering angle sensor 60 may output a steering angle signal for the steering angle.

Here, the steering angle may not be generally detected if the steering wheel 40 does not rotate, and thus the steering angle signal may not be output unless the steering wheel 40 rotates.

The torque sensor 70 may detect a steering torque generated by rotation of the steering wheel 40. In addition if the steering torque is detected, the torque sensor 70 may output a steering torque signal for the steering torque.

Here, the steering torque may mean a torque applied to a torsion bar disposed between an input shaft and an output shaft of the steering shaft 50. Therefore, steering torque can be detected even if the steering wheel 40 does not rotate.

The speed sensor 80 may detect a speed of a vehicle and output a vehicle speed signal for the vehicle speed.

The power supply unit 10 is for supplying a constant driving voltage to the controller 20, and the driving voltage may be a DC voltage.

The controller 20 or a control unit may receive steering information, calculate a target rack position for providing steering assist force, and output a target current corresponding to the rack position to the dual winding steering motor unit 30.

Here, the steering information may include a steering angle signal output by the steering angle sensor 60, a steering torque signal output by the torque sensor 70, and a vehicle speed signal output by the speed sensor 80.

The controller 20 may be implemented with hardware such as an electronic control unit (ECU) including a micro controller unit (MCU), an Inverter, and a printed circuit board (PCB) and software.

The dual winding steering motor unit 30 may receive a target current from the controller 20 and be driven at torque and rotational speed according to the target current. Although not shown, the dual winding steering motor unit 30 may transmit rotational force to the steering shaft 50 through a reducer disposed in the steering column.

The steering control device 1 may assist the operating force of the steering wheel 40 to control the driving direction of the vehicle to be easily changed with a smaller force. Specifically, the controller 20 may calculate a target rack position for providing steering assist force based on steering information of the steering angle sensor 60, the torque sensor 70, and the speed sensor 80, and may output a target current corresponding to the rack position to the dual winding steering motor unit 30.

Here, in the steering control device 1, as the steering shaft 50 of the steering column is rotated by the rotation of the dual winding steering motor unit 30, the rack bar may move left and right through a pinion gear and a rack gear connected to the output end of the steering shaft 50.

Accordingly, the steering control device 1 may move the wheels connected to both ends of the rack bar to the left or right by rotating the dual winding steering motor unit 30 which assists the operating force of the steering wheel 40, and may smoothly drive the vehicle in a desired direction.

The steering motor included in the steering control device 1 may be a dual winding steering motor including a first winding motor and a second winding motor inside, but is not limited thereto.

The controller 20 may be supplied with the power from the power supply unit 10, and may perform a function of generating and supplying a target current to be supplied to each winding of the first winding motor and the second winding motor using an inverter.

FIG. 2 illustrates a block diagram illustrating a power supply unit, a controller and a dual winding steering motor unit of a steering control device according to an embodiment, and FIG. 3 illustrates a block diagram illustrating detailed configurations of a power supply unit, a controller and a dual winding steering motor unit.

As shown in FIG. 2, the steering control device 1 may include a power supply unit 110, a controller 120 for supplying a target current from the power supply unit 110 to the dual winding steering motor unit 130, and a dual winding steering motor unit 130 driven at torque and rotational speed according to the target current from the controller 120.

The power supply unit 110 is for supplying a constant driving voltage to the controller 120, and the driving voltage may be a DC voltage.

The power supply unit 110 may be a battery, and the DC driving voltage may be 12V, 24V, or 48V, but is not limited thereto.

Here, the power supply unit 110 may include a first driving power supply unit 112-1 supplying driving power to a first inverter and a second driving power supply unit 112-2 supplying driving power to the second inverter.

The controller 120 may receive power from the power supply unit 110, and may perform a function of generating and supplying a target current to be supplied to each winding of a first winding motor 132-1 and a second winding motor 132-2 using an inverter.

The detailed configuration of the controller 120 will be described in more detail below based on FIGS. 3 to 5.

In this case, a power controller for controlling power supply from the power supply unit 110 to the controller 120 may be further included.

The dual winding steering motor unit 130 may include a first winding motor 132-1 and a second winding motor 132-2 therein, and the first winding motor 132-1 and the second winding motor 132-2 may rotate in one direction or in the opposite direction by the target current of the inverter supplied to each winding.

Therefore, in the steering control device 1, the steering shaft 50 of the steering column may be rotated by the rotation of the dual winding steering motor unit 130 for assisting the operating force of the steering wheel 40. The wheels connected to both ends of the rack bar may turn left or right through a pinion gear connected to the output end of the steering shaft 50 and a rack gear, so that the vehicle may be steered in a desired direction.

In one aspect of the present disclosure, a steering control device may include a dual winding steering motor unit 130 including a first winding motor 132-1 and a second winding motor 132-2 therein, and a controller 120 which switches a driving power supplied from a power supply unit 110 to drive the dual winding steering motor unit 130, detects an output value based on a phase current detection value detected by a phase current sensor, compares the output value with a predetermined reference value, and controls the dual winding steering motor unit 130 to a target output value based on the comparison result.

The controller 120 may drive the dual winding steering motor unit 130 by switching a driving power supplied from a power supply unit 110. In addition, the controller 120 may detect an output value based on a phase current detection value detected by a phase current sensor, compare the output value with a predetermined reference value, and control the dual winding steering motor unit 130 to a target output value based on the comparison result.

That is, the controller 120 may output a target current corresponding to the rack position to the dual winding steering motor unit 130 according to the target output value.

Here, the phase current sensor of the present embodiment may include a first shunt sensor connected to the ground terminal (GND) of the first inverter 124-1, and a second shunt sensor connected to the ground terminal (GND) of the second inverter 124-2.

The phase current sensor may be composed of a current sensor such as a shunt sensor using a resistor and a Hall sensor using a Hall effect.

As shown in FIG. 3, the controller 120 may include a first inverter 124-1 which drives the first winding motor 132-1 by switching the driving power supplied from the power supply unit 110, a second inverter 124-2 for driving the second winding motor 132-2 by switching the driving power supplied from the power supply unit 110, a first controller 122-1 for detecting a first output value of the first inverter 124-1 based on the phase current detection value of the first inverter 124-1 detected by the phase current sensor, and a second controller 122-2 for detecting a second output value of the second inverter 124-2 based on the phase current detection value of the second inverter 124-2 detected by the phase current sensor. In addition, the first controller 122-1 and the second controller 122-2 may exchange first output value and second output value information through an internal communication, compare the first output value and the second output value with a preset reference value, and determine a target output value according to the comparison result. The first inverter 124-1 and the second inverter 124-2 may drive the first winding motor 132-1 and the second winding motor 132-2 to the target output value.

The controller 120 may include an ECU1 composed of a first inverter 124-1 and a first controller 122-1, and an ECU2 composed of a second inverter 124-2 and a second controller 122-2.

The ECU1 may receive driving power from the first driving power supply unit 112-1 to drive the first winding motor 132-1, and ECU2 may receive driving power from the second driving power supply unit 112-2 to drive the second winding motor 132-2.

In this case, the ECU1 and ECU2 may exchange information through a mutual external communication or internal communication.

The first inverter 124-1 may switch driving power supplied from the first driving power supply unit 112-1 to drive the first winding motor 132-1.

The second inverter 124-2 may switch driving power supplied from the second driving power supply unit 112-2 to drive the second winding motor 132-2.

The first controller 122-1 may detect a first output value of the first inverter 124-1 based on the detected phase current value of the first inverter 124-1 detected by the phase current sensor, may compare the first output value and the second output value with a preset reference value, may determine a target output value according to the comparison result, and may output a control signal so that the first inverter 124-1 controls the first winding motor 132-1 to the target output value according to the determined target output value.

In this case, the first inverter 124-1 may control the first winding motor 132-1 to the target output value according to the control signal.

More specifically, the first controller 122-1 may include a first output value detector 222-1 which detects a first output value of the first inverter 124-1 based on the detected value of the phase current of the first inverter 124-1 detected by the phase current sensor, a first output value determiner 224-1 which requests a second output value through internal communication, compares the second output value with a preset reference value, and determines a target output value so that the first output value is output high if the second output value is lower than the preset reference value, and a first control signal output unit 226-1 for outputting a control signal so that the first inverter 124-1 controls the first winding motor 132-1 to the target output value according to the determined target output value.

FIG. 4 is a block diagram illustrating a detailed configuration of a first controller according to an embodiment.

Referring to FIG. 4, the first output value detector 222-1 may detect the first output value of the first inverter 124-1 based on the detected value of the phase current of the first inverter 124-1 detected by the phase current sensor.

The first output value determiner 224-1 may request a second output value through internal communication, compare the second output value with a preset reference value, and determine a target output value so that the first output value is output high if the second output value is lower than the preset reference value.

Here, if the first output value is lower than the preset reference value, the first output value determiner 224-1 may determine the target output value so as to output the first output value as the maximum output value which can be output at the present time.

The first control signal output unit 226-1 may output a control signal so that the first inverter 124-1 controls the first winding motor 132-1 to the target output value according to the determined target output value.

The second controller 122-2 may detect a first output value of the second inverter 124-2 based on the detected phase current value of the second inverter 124-2 detected by the phase current sensor, may compare the first output value and the second output value with a preset reference value, may determine a target output value according to the comparison result, and may output a control signal so that the second inverter 124-2 controls the second winding motor 132-2 to the target output value according to the determined target output value.

In this case, the second inverter 124-2 may control the second winding motor 132-2 to the target output value according to the control signal.

More specifically, the second controller 122-2 may include a second output value detector 222-2 which detects a second output value of the second inverter 124-2 based on the detected value of the phase current of the second inverter 124-2 detected by the phase current sensor, a second output value determiner 224-2 which requests a first output value through internal communication, compares the first output value with a preset reference value, and determines a target output value so that the second output value is output high if the first output value is lower than the preset reference value, and a second control signal output unit 226-2 for outputting a control signal so that the second inverter 124-2 controls the second winding motor 132-2 to the target output value according to the determined target output value.

FIG. 5 is a block diagram illustrating a detailed configuration of a second controller according to an embodiment.

Referring to FIG. 5, the second output value detector 222-2 may detect the second output value of the second inverter 124-2 based on the detected value of the phase current of the second inverter 124-2 detected by the phase current sensor.

The second output value determiner 224-2 may request a first output value through internal communication, compare the first output value with a preset reference value, and determine a target output value so that the second output value is output high if the first output value is lower than the preset reference value.

Here, if the second output value is lower than the preset reference value, the second output value determiner 224-2 may determine the target output value so as to output the second output value as the maximum output value which can be output at the present time.

The second control signal output unit 226-2 may output a control signal so that the second inverter 124-2 controls the second winding motor 132-1 to the target output value according to the determined target output value.

Here, the first controller 122-1 and the second controller 122-2 may exchange first output value and second output value information through a mutual internal communication.

Accordingly, the first controller 122-1 and the second controller 122-2 may compare the first output value and the second output value with a preset reference value, and may determine the target output value according to the comparison result. In addition, the first inverter 124-1 may control the first winding motor 132-1 and the second inverter 124-2 may control the second winding motor 132-2 based on the target output value.

That is, the controller 120 may detect a maximum output value that can be output at the present time of the first inverter 124-1 and detect a maximum output value that can be output at the present time of the second inverter 124-2. In addition, the controller 120 may determine a target output value of the first output value and the second output value such that a value obtained by adding the first output value and the second output value becomes a preset control value. Then, the controller 120 may output, based on the determined target output value, a control signal so that the first inverter 124-1 controls the first winding motor 132-1 to the target output value, and may output a control signal so that the second inverter 124-2 controls the second winding motor 132-2 to the target output value.

For example, in the case that the controller 120 detects a maximum output value of the first inverter 124-1 as 2.8 Nm and a maximum output value of the second inverter 124-2 as 2.8 Nm, the controller 120 may determine target output values of the first output value and the second output value as 2.2 Nm and 2.2 Nm, respectively, so that a value obtained by adding the first output value and the second output value becomes a preset control value of 4.4 Nm. Then, the controller 120 may output a control signal so that the first inverter 124-1 controls the first winding motor 132-1 to a target output value of 2.2 Nm, and may output a control signal so that the second inverter 124-2 controls the second winding motor 132-2 to a target output value of 2.2 Nm.

In addition, if the first output value is lower than the preset reference value, the controller 120 of an embodiment may detect a maximum output value that can be output at the present time of the first inverter 124-1 and a maximum output value that can be output at the present time of the second inverter 124-2. In addition, the controller 120 may determine a target output value of the second output value in a state in which the first output value is output as the maximum output value so that a value obtained by adding the first output value and the second output value becomes a preset control value. In addition, the controller 120 may output a control signal so that the second inverter 124-2 controls the second winding motor 132-2 to the target output value according to the determined target output value.

For example, if the first output value is lower than the preset reference value of 2.2 Nm, the controller 120 may detect the maximum output value of the first inverter 124-1 as 1.7 Nm and detect the maximum output value of the second inverter 124-2 as 2.8 Nm. In this case, the controller 120 may determine the target output value of the second output value to 2.7 Nm in a state where the first output value is the maximum output of 1.7 Nm so that the value obtained by adding the first output value and the second output value becomes a preset control value of 4.4 Nm. Then, the controller 120 may output a control signal so that the first inverter 124-1 controls the first winding motor 132-1 to a target output value of 1.7 Nm, and may output a control signal so that the second inverter 124-2 controls the second winding motor 132-2 to a target output value of 2.7 Nm.

In this case, if the maximum output value that can be output at the present time of the first inverter 124-1 is lower than the preset reference value, and the maximum output value that can be output at the present time of the second inverter 124-2 is higher than the preset reference value, the controller 120 may determine an operating state of the dual winding steering motor unit 130 as a normal state, and may simultaneously output a first output value warning and normal state information.

In addition, if the second output value is lower than the preset reference value, the controller 120 of an embodiment may detect a maximum output value that can be output at the present time of the first inverter 124-1 and a maximum output value that can be output at the present time of the second inverter 124-2. In addition, the controller 120 may determine a target output value of the first output value in a state in which the second output value is output as the maximum output value so that a value obtained by adding the first output value and the second output value becomes a preset control value. In addition, the controller 120 may output a control signal so that the first inverter 124-1 controls the first winding motor 132-1 to the target output value according to the determined target output value.

For example, if the second output value is lower than the preset reference value of 2.2 Nm, the controller 120 may detect the maximum output value of the first inverter 124-1 as 2.8 Nm and detect the maximum output value of the second inverter 124-2 as 1.7 Nm. In this case, the controller 120 may determine the target output value of the first output value to 2.7 Nm in a state where the second output value is the maximum output of 1.7 Nm so that the value obtained by adding the first output value and the second output value becomes a preset control value of 4.4 Nm. Then, the controller 120 may output a control signal so that the first inverter 124-1 controls the first winding motor 132-1 to a target output value of 2.7 Nm, and may output a control signal so that the second inverter 124-2 controls the second winding motor 132-2 to a target output value of 1.7 Nm.

In this case, if the maximum output value that can be output at the present time of the first inverter 124-1 is higher than the preset reference value, and the maximum output value that can be output at the present time of the second inverter 124-2 is lower than the preset reference value, the controller 120 may determine an operating state of the dual winding steering motor unit 130 as a normal state, and may simultaneously output a second output value warning and normal state information.

In addition, the controller 120 may detect a maximum output value that can be output at the present time of the first inverter 124-1 and detect a maximum output value that can be output at the present time of the second inverter 124-2. In addition, if the maximum output value of the first inverter is higher than the preset reference value and the maximum output value of the second inverter 124-2 is higher than the preset reference value, the controller 120 may equally determine target output values of the first output value and the second output value so that a value obtained by adding the first output value and the second output value becomes a preset control value. Then, the controller 120 may output, based on the determined target output value, a control signal so that the first inverter 124-1 controls the first winding motor 132-1 to the target output value, and may output a control signal so that the second inverter 124-2 controls the second winding motor 132-2 to the target output value.

For example, in the case that the controller 120 detects a maximum output value of the first inverter 124-1 as 2.8 Nm and a maximum output value of the second inverter 124-2 as 2.8 Nm, the controller 120 may determine target output values of the first output value and the second output value as 2.2 Nm and 2.2 Nm, respectively, so that a value obtained by adding the first output value and the second output value becomes a preset control value of 4.4 Nm. Then, the controller 120 may output a control signal so that the first inverter 124-1 controls the first winding motor 132-1 to a target output value of 2.2 Nm, and may output a control signal so that the second inverter 124-2 controls the second winding motor 132-2 to a target output value of 2.2 Nm.

In this case, if the maximum output value that can be output at the present time of the first inverter 124-1 is higher than the preset reference value, and the maximum output value that can be output at the present time of the second inverter 124-2 is higher than the preset reference value, the controller 120 may determine an operating state of the dual winding steering motor unit 130 as a normal state, and may output normal state information.

In addition, the controller 120 may detect a maximum output value that can be output at the present time of the first inverter 124-1 and detect a maximum output value that can be output at the present time of the second inverter 124-2. In addition, if the maximum output value of the first inverter is lower than the preset reference value and the maximum output value of the second inverter 124-2 is lower than the preset reference value, the controller 120 may determine the maximum output value of the first output value and the second output value as the target output value. Then, the controller 120 may output, based on the determined target output value, a control signal so that the first inverter 124-1 controls the first winding motor 132-1 to the target output value, and may output a control signal so that the second inverter 124-2 controls the second winding motor 132-2 to the target output value.

For example, in the case that the controller 120 detects a maximum output value of the first inverter 124-1 as 1.7 Nm and a maximum output value of the second inverter 124-2 as 1.7 Nm, the controller 120 may determine a maximum output value of 1.7 Nm of the first output value and the second output value as a target output value. Then, the controller 120 may output a control signal so that the first inverter 124-1 controls the first winding motor 132-1 to a target output value of 2.2 Nm, and may output a control signal so that the second inverter 124-2 controls the second winding motor 132-2 to a target output value of 2.2 Nm.

In this case, if the maximum output value that can be output at the present time of the first inverter 124-1 is lower than the preset reference value, and the maximum output value that can be output at the present time of the second inverter 124-2 is lower than the preset reference value, the controller 120 may determine an operation state of the dual winding steering motor unit 130 is an insufficient output state and output state information indicating the insufficient output state.

Here, the state information may be output through a display unit including a liquid crystal display (LCD), a head-up display (HUD), and the like.

The display unit may include an audio output module such as a speaker capable of outputting audio data.

FIG. 6 is a block diagram illustrating detailed configurations of a power supply unit, a controller, and a dual winding steering motor unit according to another embodiment.

In another embodiment, the power supply unit 310 may include a first driving power supply unit 312-1 and a second driving power supply unit 312-2, and the controller 320 may include an ECU1 composed of a controller 322-1 and a first inverter 324-1 and an ECU2 composed of a second inverter 324-2, and the steering motor unit 330 may include a first motor 332-1 and a second motor 332-2.

Here, the steering motor unit 330 may be composed of a first motor 332-1 and a second motor 332-2 that are different from each other, or may be configured with a dual winding steering motor including a first winding motor and a second winding motor therein.

The ECU1 may receive driving power from the first driving power supply unit 312-1 to drive the first motor 332-1, and the ECU2 may receive driving power from the second driving power supply unit 312-2 to drive the second motor 332-2.

In this case, the ECU1 and ECU2 may exchange information through a mutual external communication or an internal communication, and the controller 322-1 may control the first inverter 324-1 and the second inverter 324-2 through external communication or internal communication.

The first inverter 324-1 may switch driving power supplied from the first driving power supply unit 312-1 to drive the first motor 332-1.

The second inverter 324-2 may switch driving power supplied from the second driving power supply unit 312-2 to drive the second motor 332-2.

The controller 322-1 may detect a first output value of the first inverter 324-1 based on the phase current detection value of the first inverter 324-1 detected by the phase current sensor, and compare the first output value and the second output value with a preset reference value. In addition, the controller 322-1 may determine a target output value based on the comparison result, and output a control signal so that the first inverter 324-1 controls the first motor 332-1 to the target output value according to the determined target output value.

In addition, the controller 322-1 may detect a second output value of the second inverter 324-2 based on the phase current detection value of the second inverter 324-2 detected by the phase current sensor, and compare the first output value and the second output value with a preset reference value. In addition, the controller 322-1 may determine a target output value based on the comparison result, and output a control signal so that the second inverter 324-2 controls the second motor 332-2 to the target output value according to the determined target output value.

In this case, the controller 322-1 may determine the target output value of the first output value and the second output value such that a value obtained by adding the first output value and the second output value becomes a preset control value.

The first inverter 324-1 may control the first motor 332-1 to a target output value according to the control signal, and the second inverter 324-2 may control the second motor 332-2 to a target output value according to the control signal.

FIG. 7 is a flowchart illustrating a steering control method of a vehicle according to an embodiment.

In another aspect, a steering control method of a vehicle according to an embodiment may include a first control step in which a first controller 122-1 of a controller 120 detects a first output value of a first inverter 124-1 based on a phase current detection value of the first inverter detected by a phase current sensor and compares the first output value with a reference value to determine a target output value according to the comparison result, and the first inverter 124-1 controls a first winding motor 132-1 to the target output value (S500); a second control step in which a second controller 122-2 of the controller 120 detects a second output value of a second inverter 124-2 based on a phase current detection value of the second inverter 124-2 detected by the phase current sensor and compares the second output value with a reference value to determine a target output value according to the comparison result, and the second inverter 124-2 controls a second winding motor 132-2 to the target output value (S600). In this case, the controller 120 may exchange information on the first output value and the second output value through an internal communication, compare the first output value and the second output value with the reference value to determine the target output value according to the comparison result.

In the first control step (S500), the first controller 122-1 of the controller 120 may detect a first output value of a first inverter 124-1 based on a phase current detection value of the first inverter detected by a phase current sensor and compare the first output value with a reference value to determine a target output value according to the comparison result, and the first inverter 124-1 may control a first winding motor 132-1 to the target output value.

In the second control step (S600), a second controller 122-2 of the controller 120 may detect a second output value of a second inverter 124-2 based on a phase current detection value of the second inverter 124-2 detected by the phase current sensor and compare the second output value with a reference value to determine a target output value according to the comparison result, and the second inverter 124-2 may control a second winding motor 132-2 to the target output value.

In this case, the controller 120 may exchange information on the first output value and the second output value through an internal communication.

In addition, the controller 120 may compare the first output value and the second output value with the reference value, and may determine a target output value such that a value obtained by adding the first output value and the second output value becomes a preset control value according to the comparison result.

FIG. 8 is a flowchart illustrating a first control step according to an embodiment.

More specifically, the first control step (S500) may include detecting, by a first output value detector 222-1 of the first controller 122-1, the first output value of the first inverter 124-1 based on the phase current detection value of the first inverter 124-1 detected by the phase current sensor (S520); requesting, by a first output value determiner 224-1 of the first controller 122-1, the second output value through the internal communication, comparing the second output value with the reference value, and determining the target output value to output the first output value high if the second output value is lower than the reference value (S540); outputting, by a first control signal output unit 226-1 of the first controller 122-1, a control signal so that the first inverter 124-1 controls the first winding motor 132-1 to the target output value according to the determined target output value (S560); and supplying, by the first inverter 124-1, driving power to the first winding motor 132-1 with the target output value according to the control signal (S580).

That is, in step S520, the first output value detector 222-1 of the first controller 122-1 may detect the first output value of the first inverter based on the phase current detection value of the first inverter 124-1 detected by the phase current sensor.

In addition, in step S540, the first output value determiner 224-1 of the first controller 122-1 may request the second output value through the internal communication, compare the second output value with the reference value, and determine the target output value to output the first output value high if the second output value is lower than the reference value.

In addition, in step S560, the first control signal output unit 226-1 of the first controller 122-1 may output a control signal so that the first inverter 124-1 controls the first winding motor 132-1 to the target output value according to the determined target output value.

Furthermore, in step S580, the first inverter 124-1 may supply the driving power to the first winding motor 132-1 to the target output value according to the control signal.

FIG. 9 is a flowchart illustrating a second control step according to an embodiment In the second control step) may include detecting, by a second output value detector 222-2 of the second controller 122-2, the second output value of the second inverter 124-2 based on the phase current detection value of the second inverter 124-2 detected by the phase current sensor (S620); requesting, by a second output value determiner 224-2 of the second controller 122-2, the first output value through the internal communication, comparing the first output value with the reference value, and determining the target output value to output the second output value high if the first output value is lower than the reference value (S640); outputting, by a second control signal output unit 226-2 of the second controller 122-2, a control signal so that the second inverter 124-2 controls the second winding motor 132-2 to the target output value according to the determined target output value (S660); and supplying, by the second inverter 124-2, driving power to the second winding motor 132-2 with the target output value according to the control signal (S680).

That is, in step S620, the second output value detector 222-2 of the second controller 122-2 may detect the second output value of the second inverter 124-2 based on the phase current detection value of the second inverter 124-2 detected by the phase current sensor.

In addition, in step S640, the second output value determiner 224-2 of the second controller 122-2 may request the first output value through the internal communication, compare the first output value with the reference value, and determine the target output value to output the second output value high if the first output value is lower than the reference value.

In addition, in step S660, the second control signal output unit 226-2 of the second controller 122-2 may output a control signal so that the second inverter 124-2 controls the second winding motor 132-2 to the target output value according to the determined target output value.

Furthermore, in step S680, the second inverter 124-2 may supply the driving power to the second winding motor 132-2 to the target output value according to the control signal.

The controller 120 of the present embodiment may detect a maximum output value that can be output at the present time of the first inverter 124-1 if the first output value is lower than the reference value. In addition, the controller 120 may determine the target output value of the second output value in a state in which the first output value is output at a maximum such that a value obtained by adding the first output value and the second output value is a preset control value. In addition, the controller 120 may output a control signal so that the second inverter 124-2 controls the second winding motor 132-2 to the target output value according to the determined target output value.

The controller 120 may detect a maximum output value that can be output at the present time of the second inverter 124-2 if the second output value is lower than the reference value. In addition, the controller 120 may determine the target output value of the first output value in a state in which the second output value is output at a maximum such that a value obtained by adding the first output value and the second output value is a preset control value. In addition, the controller 120 may output a control signal so that the first inverter 124-1 controls the first winding motor 132-1 to the target output value according to the determined target output value.

Alternatively, the controller 120 may detect a maximum output value that can be output at the present time of the first inverter 124-1 and a maximum output value that can be output at the present time of the second inverter 124-2. The controller 120 may equally determine, if the maximum output value of the first inverter is higher than the reference value and the maximum output value of the second inverter is higher than the reference value, the target output values of the first output value and the second output value such that a sum of the first output value and the second output value is a preset control value. In addition, the controller 120 may output, according the determined target output values, a control signal so that the first inverter 124-1 controls the first winding motor 132-1 to the target output value, and output a control signal so that the second inverter 124-2 controls the second winding motor 132-2 to the target output value.

In addition, the controller 120 may detect a maximum output value that can be output at the present time of the first inverter 124-1 and a maximum output value that can be output at the present time of the second inverter 124-2. The controller 120 may determine a maximum output value of the first output value and the second output value as the target output value if the maximum output value of the first inverter 124-1 is lower than the reference value and the maximum output value of the second inverter 124-2 is lower than the reference value. In addition the controller 120 may output, according the determined target output values, a control signal so that the first inverter 124-1 controls the first winding motor 132-1 to the target output value, and output a control signal so that the second inverter 124-2 controls the second winding motor 132-2 to the target output value.

As described above, according to the present embodiments, if an output limit occurs due to a decrease in the voltage supplied to any one ECU among the plurality of ECUs, it is possible to maximize an output of the ECU whose output is low and increase an output of the ECU where the output limit does not occur so as to maintain the entire output at a normal output, thereby stably performing the steering of a vehicle.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A steering control device of a vehicle comprising:
   a dual winding steering motor unit including a first winding motor and a second winding motor therein; and
   a controller configured to, in order to switch a driving power supplied from a power supply unit to drive the dual winding steering motor unit,
   detect an output value based on a phase current detection value detected by a phase current sensor, and
   compare the output value with a reference value and control the dual winding steering motor unit to a target output value based on the comparison result,
   wherein the controller comprises:
   a first inverter configured to drive the first winding motor by switching the driving power supplied from the power supply unit;
   a second inverter configured to drive the second winding motor by switching the driving power supplied from the power supply unit;

a first controller configured to detect a first output value of the first inverter based on a phase current detection value of the first inverter detected by the phase current sensor; and a second controller configured to detect a second output value of the second inverter based on a phase current detection value of the second inverter detected by the phase current sensor, wherein the first controller and the second controller are configured to exchange information on the first output value and the second output value through an internal communication, compare the first output value and the second output value with the reference value and determine the target output value according to the comparison result, and wherein the first inverter and the second inverter are configured to control the first winding motor and the second winding motor according to the target output values, wherein the power supply unit comprises a first driving power supply unit for supplying the driving power to the first inverter, wherein the first controller comprises:

a first output value detector configured to detect the first output value of the first inverter based on the phase current detection value of the first inverter detected by the phase current sensor;

a first output value determiner configured to request the second output value through the internal communication, compare the second output value with the reference value, and determine the target output value to output the first output value high if the second output value is lower than the reference value; and a first control signal output unit configured to output a control signal so that the first inverter controls the first winding motor to the target output value according to the target output value.

2. The steering control device of claim 1, wherein the power supply unit comprises a second driving power supply unit for supplying the driving power to the second inverter, wherein the second controller comprises:

a second output value detector configured to detect the second output value of the second inverter based on the phase current detection value of the second inverter detected by the phase current sensor;

a second output value determiner configured to request the first output value through the internal communication, compare the first output value with the reference value, and determine the target output value to output the second output value high if the first output value is lower than the reference value; and a second control signal output unit configured to output a control signal so that the second inverter controls the second winding motor to the target output value according to the target output value.

3. The steering control device of claim 1, wherein the phase current sensor comprises:

a first shunt sensor connected to a ground terminal of the first inverter; and a second shunt sensor connected to a ground terminal of the second inverter.

4. A steering control device of a vehicle comprising:

a dual winding steering motor unit including a first winding motor and a second winding motor therein; and a controller configured to, in order to switch a driving power supplied from a power supply unit to drive the dual winding steering motor unit, detect an output value based on a phase current detection value detected by a phase current sensor, and compare the output value with a reference value and control the dual winding steering motor unit to a target output value based on the comparison result, wherein the controller comprises:

a first inverter configured to drive the first winding motor by switching the driving power supplied from the power supply unit;

a second inverter configured to drive the second winding motor by switching the driving power supplied from the power supply unit;

a first controller configured to detect a first output value of the first inverter based on a phase current detection value of the first inverter detected by the phase current sensor; and a second controller configured to detect a second output value of the second inverter based on a phase current detection value of the second inverter detected by the phase current sensor, wherein the first controller and the second controller are configured to exchange information on the first output value and the second output value through an internal communication, compare the first output value and the second output value with the reference value and determine the target output value according to the comparison result, and wherein the first inverter and the second inverter are configured to control the first winding motor and the second winding motor according to the target output values, wherein the controller is configured to, detect a maximum output value of the first inverter and a maximum output value of the second inverter, and determine, if the maximum output value of the first inverter is higher than the reference value and the maximum output value of the second inverter is higher than the reference value, that an operation state of the dual winding steering motor unit is normal and output normal state information.

5. The steering control device of claim 4, wherein the controller is configured to, detect a maximum output value of the first inverter if the first output value is lower than the reference value, determine the target output value of the second output value in a state in which the first output value is output at a maximum such that a value obtained by adding the first output value and the second output value is a preset control value, and output a control signal so that the second inverter controls the second winding motor to the target output value according to the determined target output value.

6. The steering control device of claim 4, wherein the controller is configured to, detect a maximum output value of the second inverter if the second output value is lower than the reference value, determine the target output value of the first output value in a state in which the second output value is output at a maximum such that a value obtained by adding the first output value and the second output value is a preset control value, and output a control signal so that the first inverter controls the first winding motor to the target output value according to the determined target output value.

7. The steering control device of claim 4, wherein the controller is configured to,
    detect a maximum output value of the first inverter and a maximum output value of the second inverter,
    equally determine, if the maximum output value of the first inverter is higher than the reference value and the maximum output value of the second inverter is higher than the reference value, the target output values of the first output value and the second output value such that a sum of the first output value and the second output value is a preset control value, and
    output, according the determined target output values, a control signal so that the first inverter controls the first winding motor to the target output value, and output a control signal so that the second inverter controls the second winding motor to the target output value.

8. The steering control device of claim 4, wherein the controller is configured to,
    detect a maximum output value of the first inverter and a maximum output value of the second inverter,
    determine a maximum output value of the first output value and the second output value as the target output value if the maximum output value of the first inverter is lower than the reference value and the maximum output value of the second inverter is lower than the reference value, and
    output, according the determined target output values, a control signal so that the first inverter controls the first winding motor to the target output value, and output a control signal so that the second inverter controls the second winding motor to the target output value.

9. The steering control device of claim 4, wherein the controller is configured to,
    detect a maximum output value of the first inverter and a maximum output value of the second inverter, and
    determine, if the maximum output value of the first inverter is higher than the reference value and the maximum output value of the second inverter is lower than the reference value, that an operation state of the dual winding steering motor unit is normal and output a second output value warning and normal state information at the same time.

10. The steering control device of claim 4, wherein the controller is configured to,
    detect a maximum output value of the first inverter and a maximum output value of the second inverter, and
    determine, if the maximum output value of the first inverter is lower than the reference value and the maximum output value of the second inverter is higher than the reference value, that an operation state of the dual winding steering motor unit is normal and output a first output value warning and normal state information at the same time.

11. The steering control device of claim 4, wherein the controller is configured to,
    detect a maximum output value of the first inverter and a maximum output value of the second inverter, and
    determine, if the maximum output value of the first inverter is lower than the reference value and the maximum output value of the second inverter is lower than the reference value, that an operation state of the dual winding steering motor unit is an insufficient output state and output state information indicating the insufficient output state.

* * * * *